(12) United States Patent
Patterson et al.

(10) Patent No.: US 6,273,658 B1
(45) Date of Patent: Aug. 14, 2001

(54) ENCLOSURE FOR PROTECTING A LUG AND LUG NUT

(76) Inventors: S. Allen Patterson, 102-G Commonwealth Ct., Cary, NC (US) 27511; Joseph D. Patterson, Jr., 208 Killington Dr., Raleigh, NC (US) 27609

( * ) Notice: Subject to any disclaimer, the term of this patent is extended or adjusted under 35 U.S.C. 154(b) by 0 days.

(21) Appl. No.: 09/492,397

(22) Filed: Jan. 27, 2000

(51) Int. Cl.$^7$ .............. F16B 19/00; F16B 33/00; F16B 37/14
(52) U.S. Cl. .............. 411/431; 411/372.6; 411/428; 411/910; 301/37.37
(58) Field of Search .............. 411/372.5, 372.6, 411/373, 377, 428, 431, 910; 301/37.37, 108.1

(56) References Cited

U.S. PATENT DOCUMENTS

| | | | |
|---|---|---|---|
| 4,962,968 | * 10/1990 | Caplin | 301/37.37 |
| 5,273,384 | * 12/1993 | Dunbar | 411/428 |
| 5,380,070 | * 1/1995 | FitzGerald | 301/37.37 |
| 5,590,992 | * 1/1997 | Russell | 411/431 |
| 5,752,795 | * 5/1998 | D'Adamo | 411/373 X |

FOREIGN PATENT DOCUMENTS

2079884 * 1/1982 (GB) .............. 411/428

* cited by examiner

*Primary Examiner*—Neill Wilson
(74) *Attorney, Agent, or Firm*—Coats & Bennett

(57) ABSTRACT

The present invention entails an enclosure that encompasses and protects a lug and lug nut extending from a wheel hub. Structurally, the enclosure comprises an end wall, a surrounding side, a snap on end cap, and a lug opening or port formed in the end wall. When installed, the lug extends through the lug opening and supports the enclosure while the end wall lies exteriorly of the lug nut and the surrounding side is spaced from the lug nut but generally encompasses and surrounds the lug nut and the lug. Prior to enclosing the enclosure by snapping on the end cap, the enclosure is filled at least partially with a grease or lubricant.

17 Claims, 7 Drawing Sheets

US 6,273,658 B1

ENCLOSURE FOR PROTECTING A LUG AND LUG NUT

FIELD OF THE INVENTION

The present invention relates to devices for encapsulating or enclosing lug nuts and lugs so as to protect them from rust, corrosion and other adverse effects caused by exposure and weather.

BACKGROUND OF THE INVENTION

It is quite common to encounter a lug nut that is frozen tight to a lug extending from a wheel hub. Many times, the lug nut is so tightly bound to the lug that it cannot be loosened and removed even when treated with special oils that are designed to penetrate and loosen such a frozen nut. In fact, some lug nuts become so tightly bound and frozen to a lug that when sufficient torque is applied the entire lug breaks or is twisted off its hub.

Frozen lug nuts can be caused by a variety of conditions. Principal contributors are generally weather and environment related. For example, one of the most common places where one finds frozen lug nuts is on the hub of boat trailers. This is because the entire hub of a boat trailer is often submerged in water (fresh or salt) during the course of launching or loading a boat onto the trailer. In addition, boat trailers and other vehicles that are commonly maintained in coastal regions are prone to include rusted and corroded lug and lug nuts and this too can give rise to situations where the lug nuts become tightly bound about their lug.

Therefore, there has been and continues to be a need for some type of protective device to house and enclose lug and lug nuts that extend from boat trailer hubs and other vehicles that have hubs that are sometimes submerged in water or exposed to the elements of weather.

SUMMARY AND OBJECTS OF THE INVENTION

The present invention entails a device for protecting a lug nut and lug and also a method for providing a protective barrier and enclosure around a lug nut and its supporting lug.

More particularly, the present invention entails an enclosure that is designed to fit on a lug extending from a hub and to enclose a segment of the lug along with a threaded lug nut. Along with the enclosure that is placed around the lug nut and the lug, the method of protection entails placing a grease, protectant or other lubricant within the enclosure such that it is placed or compacted around both the lug nut and the lug so as to protect the same from weather. Because the lug and lug nut is enclosed and because of the presence of the grease or lubricant within the enclosure, the lug nut and lug are essentially housed within a protected environment that for the most part is waterproof.

It is therefore an object of the present invention to provide a simple enclosure design that is adapted to fit on the lug of a hub and to extend around and generally enclose a portion of the lug and a nut threaded thereon.

Still a further object of the present invention resides in the provision of a method for protecting a lug nut and its lug which involves injecting or placing a grease or lubricant in an enclosure that houses the lug nut and lug such that while the enclosure is disposed around the lug and lug nut, the grease or lubricant and the enclosure serve to isolate and separate the lug nut and lug from the elements of weather and even water.

A further object of the present invention resides in the provision of an open end cylinder that is designed to receive the lug and is spaced such that the accompanying nut can be threaded onto the lug and disposed within the cylindrical enclosure such that both the lug nut and the lug are confined within the enclosure.

Still a further object of the present invention resides in a method for protecting lugs and lug nuts associated with a wheel hub by providing an enclosure around the lug and lug nut that allows grease or a lubricant to be placed around the lug and the lug nut and to generally seal the same from the elements of weather and water.

Other objects and advantages of the present invention will become apparent and obvious from a study of the following description and the accompanying drawings which are merely illustrative of such invention.

DETAILED DESCRIPTION OF THE INVENTION

Figure 1:
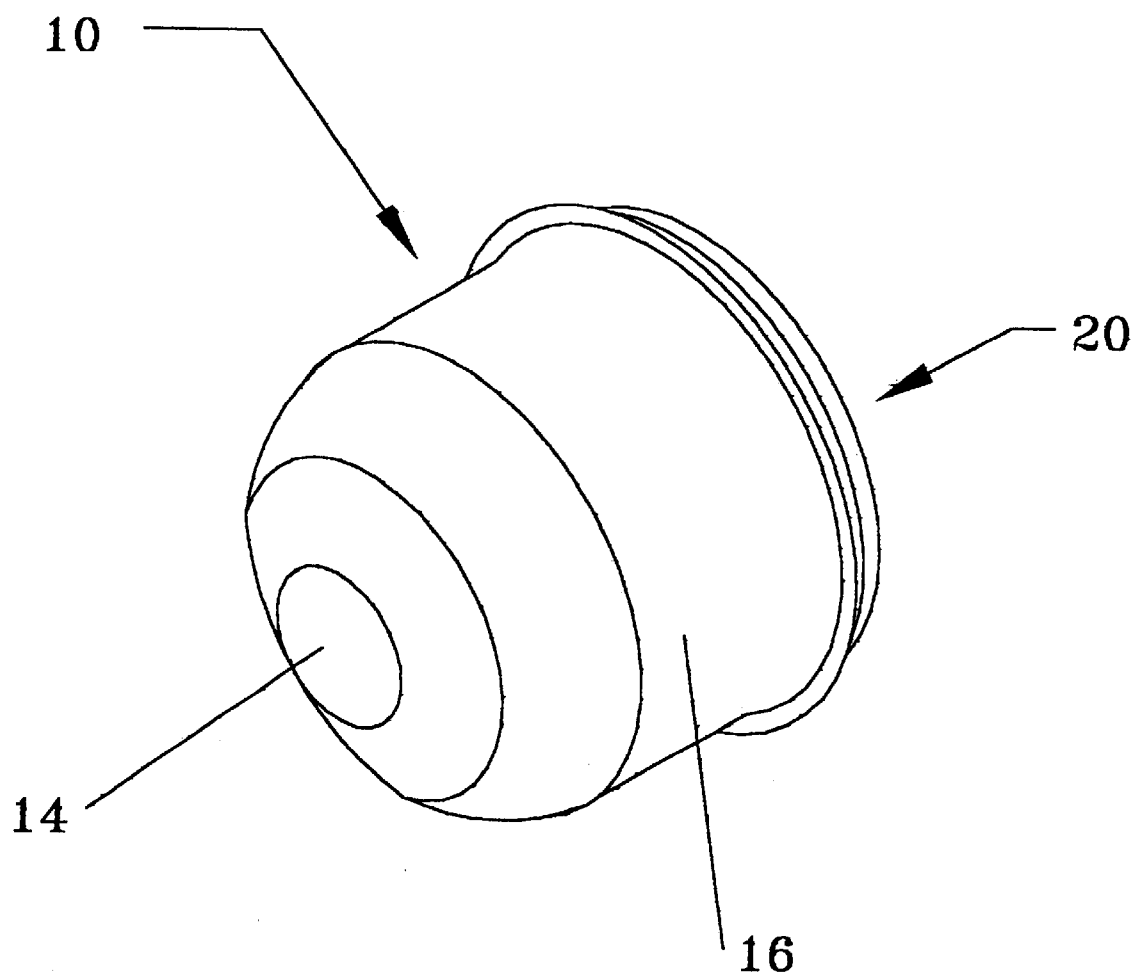
FIG. 1 is a perspective view of the lug and lug nut enclosure of the present invention.

With further reference to the drawings, the enclosure or protective housing for a lug and lug nut is shown therein and indicated generally by the numeral 10. As will be appreciated from subsequent portions of this disclosure, the enclosure 10 is designed to enclose or encapsulate a lug and lug nut extending from a wheel hub. To provide long term protection for the lug and lug nut, the enclosure, once it surrounds the lug and lug nut, is filled with a grease or lubricant.

Turning to a discussion of the enclosure 10 itself, it is seen that the same includes an end wall 12 that is of a generally concave/convex shape. More particularly, the interior side of the end wall 12 assumes a concave shape while the exterior side assumes a convex shape. Formed centrally in the end wall 12 is a lug opening 14. The purpose of the lug opening 14 is to permit a lug from a wheel hub to be extended therethrough.

Projecting from the end wall 12 is a surrounding side 16. In the case of the embodiment illustrated herein, the surrounding side 16 is generally cylindrical and the end wall 12 and surrounding side 16 form an open ended cylinder. As seen in the drawings, the end of the enclosure opposite the end wall is open. As will be appreciated from subsequent portions of the disclosure, this will permit a lug nut to be threaded on to a lug that projects into the confines of the enclosure 10.

In order to enclose the enclosure 10, there is provided a snap on end cap 20. Cap 20 includes an integral angled recess 22 that is designed to engage and snap over a surrounding lip 18 that circumferentially extends around the outer surface of the surrounding side 16 adjacent the open end of the enclosure 10. Thus, when the snap on cap 20 is secured across the open end of the enclosure 10 it is appreciated that the entire enclosure is closed except for the lug opening 14 formed in the end wall 12.

Enclosure 10, just described, is designed to enclose and protect a lug and lug nut that typically extends from a wheel hub. To illustrate the application of the enclosure 10, the drawings (FIG. 2) show a conventional hub 30 that includes a lug 32 projecting therefrom and a lug nut 34 threaded on the lug 32. In the case of the design illustrated in the drawings, the lug nut 34 is of a conventional design and includes a dome head 34a. Typically, a wheel hub is provided with a series of lugs 32 and lug nuts 34. The function of the lug nuts is to secure a rim or wheel 36 to the hub 30.

Figure 2:
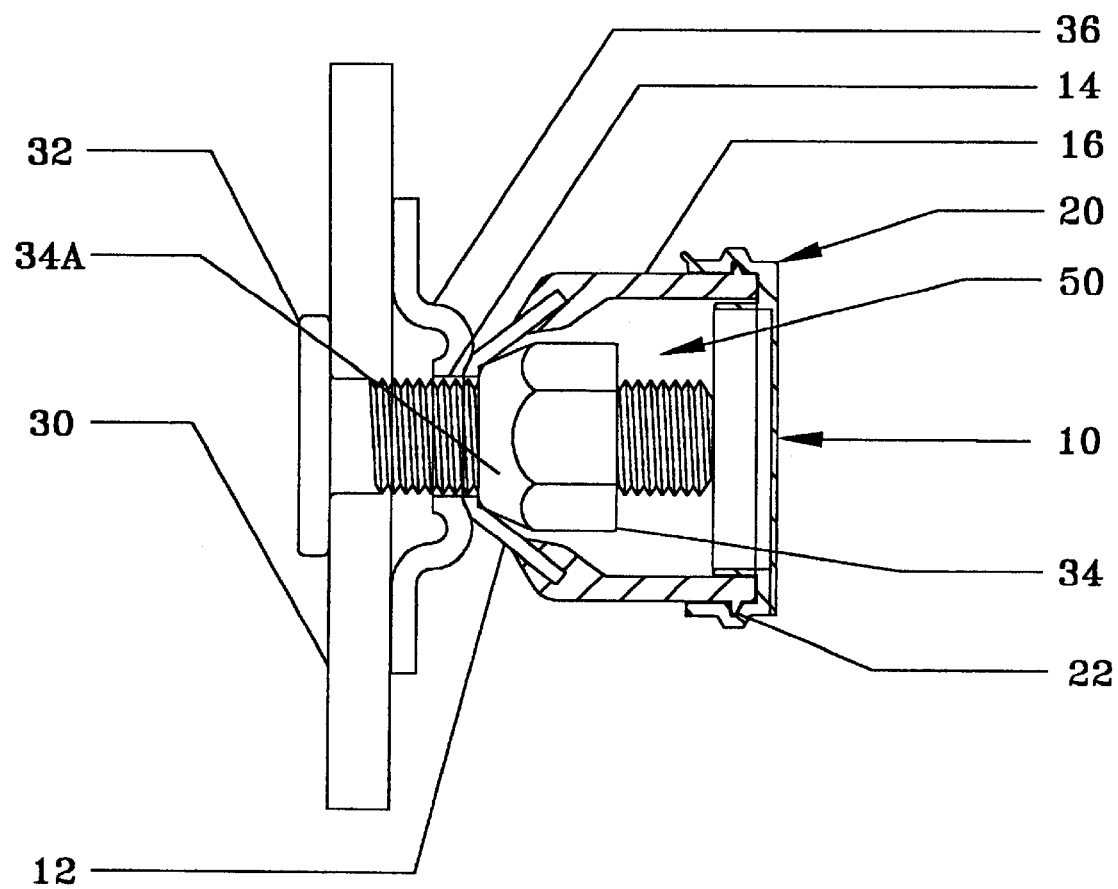
FIG. 2 is a sectional view illustrating the enclosure of the present invention disposed around a lug and lug nut.
Figure 3:
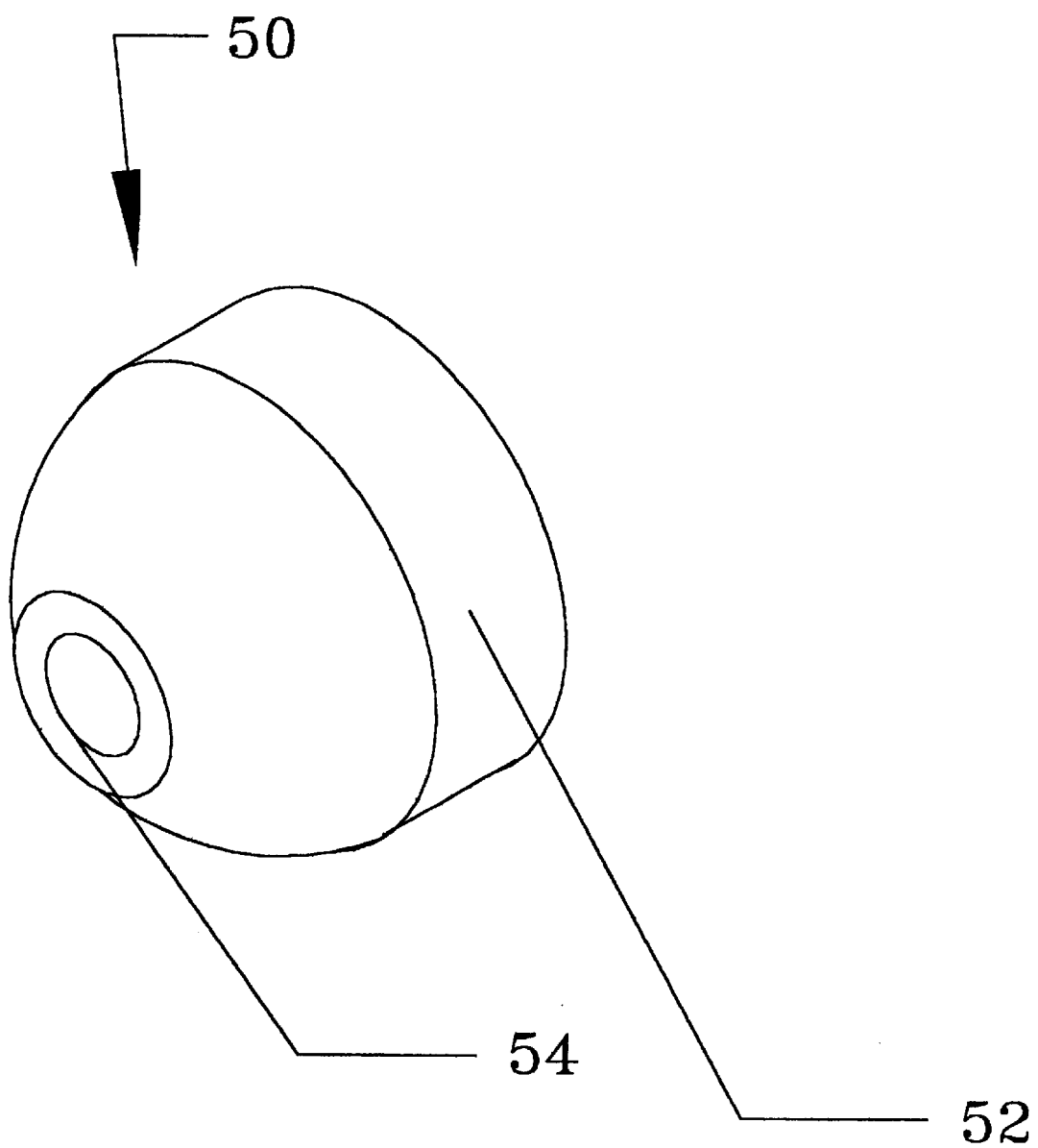
FIG. 3 is a perspective view of a second design for the lug and lug nut enclosure of the present invention.
Figure 4:
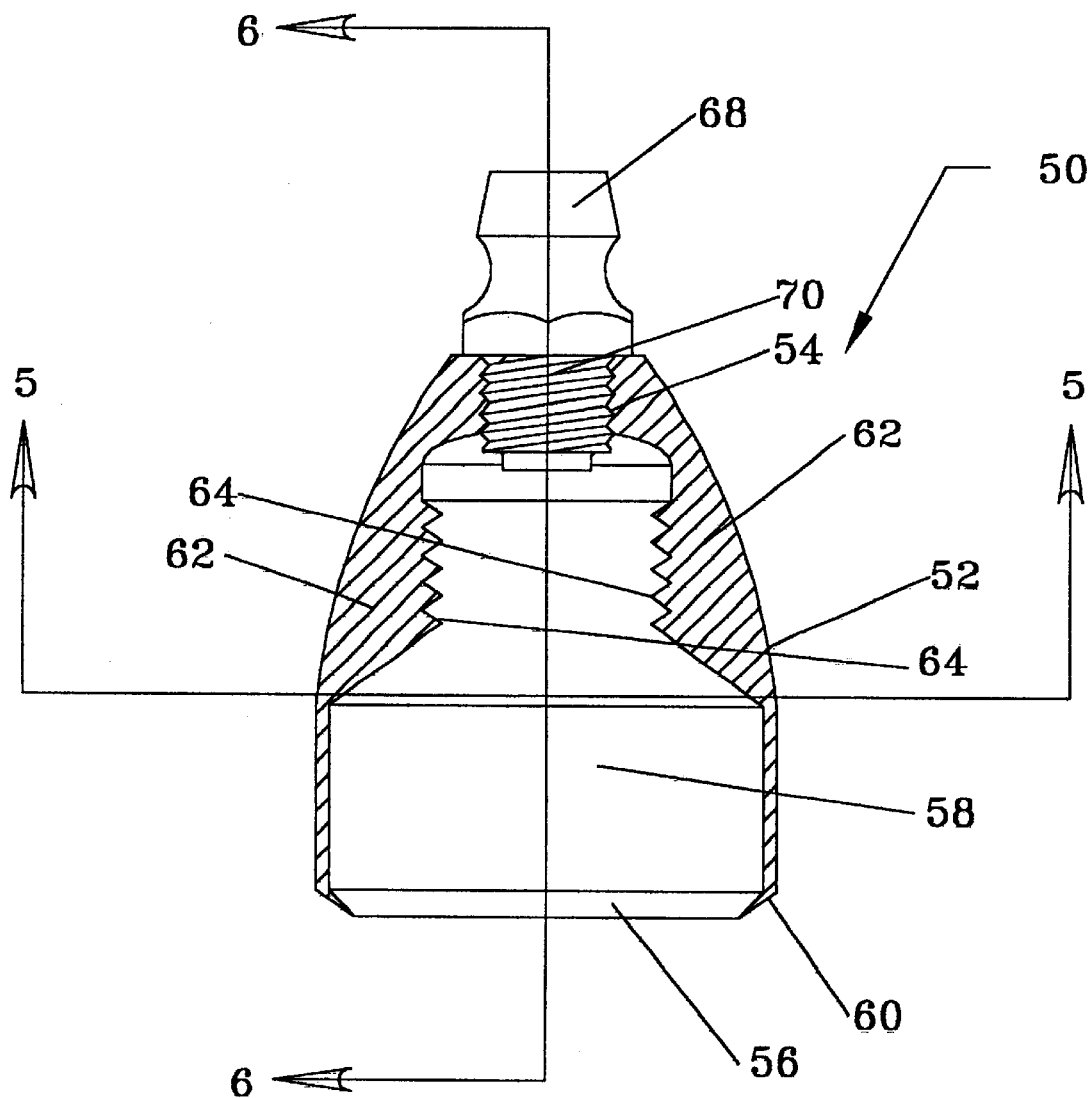
FIG. 4 is a sectional view of the second enclosure shown in FIG. 3.
Figure 5:
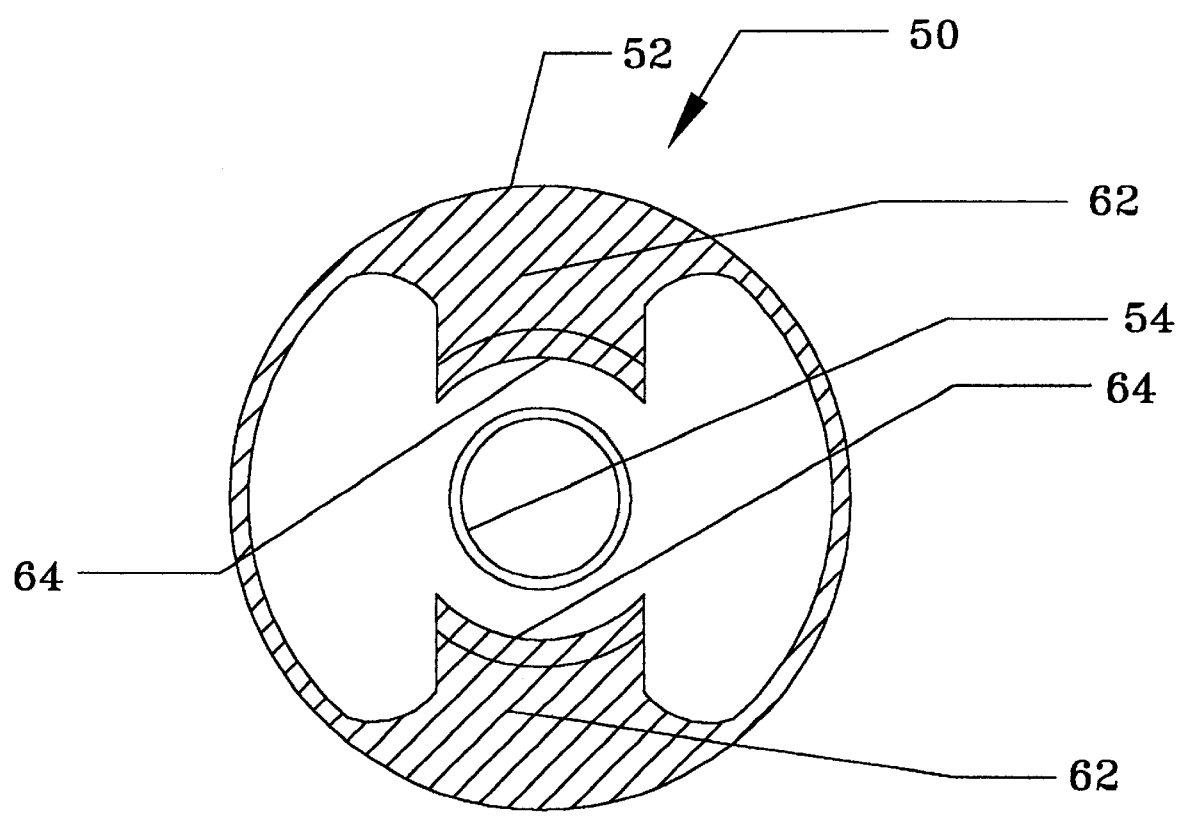
FIG. 5 is an end elevational view of the enclosure shown in FIG. 3.
Figure 6:
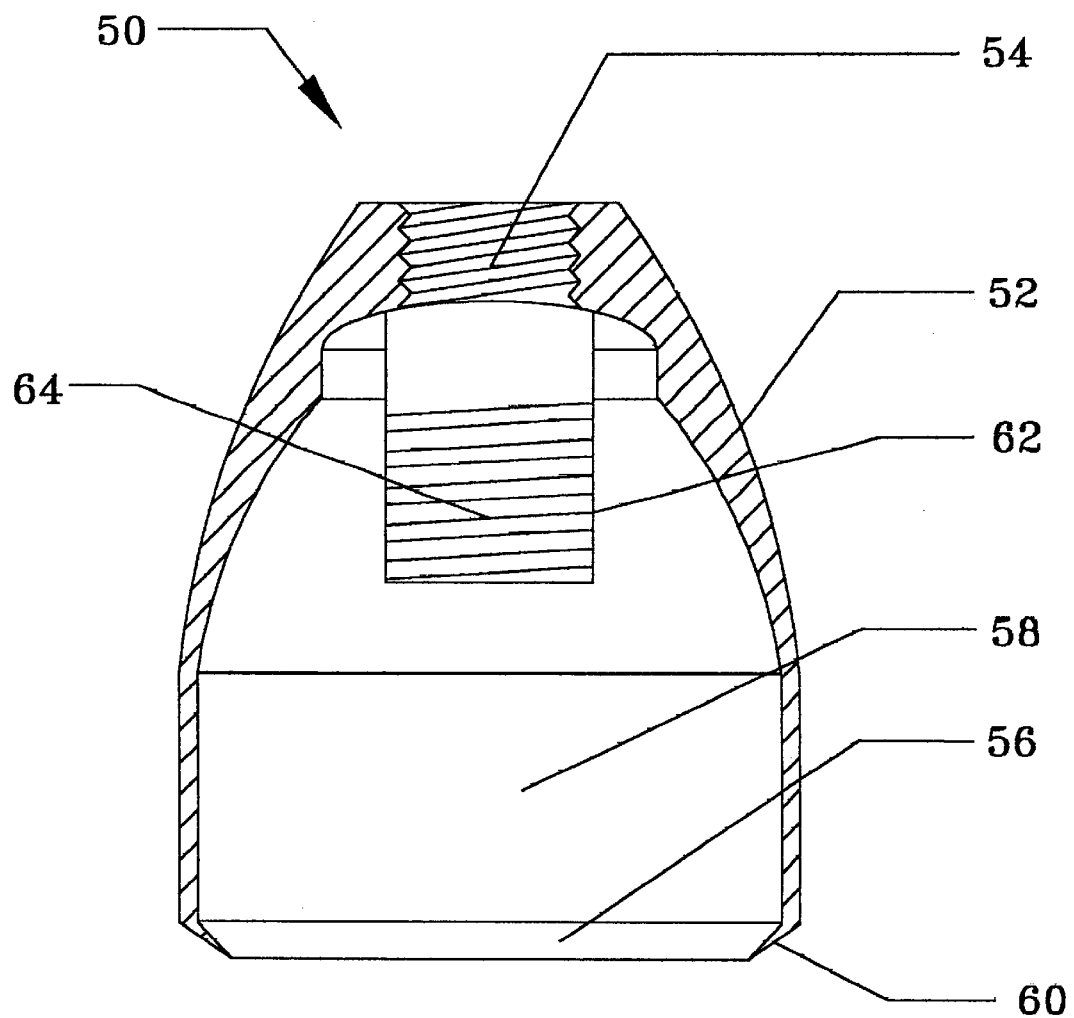
FIG. 6 is a sectional view taken through the line 6—6 of FIG. 4.

In FIG. 2, the enclosure 10 is shown extending outwardly from the wheel or rim 36 and generally enclosing a segment of the lug 32 and the lug nut 34 threaded thereon. It is seen that there is formed an internal cavity 50 within the enclosure 10. The internal cavity 50 is bounded by the end wall 12, surrounding sides 16 and the snap on cap 20. Also, it is seen that the surrounding side 16 of the enclosure 10 is sized or dimensioned such that it is spaced outwardly from the lug nut 34. This enables the lug nut 34 to be screwed onto the lug 32 while the enclosure 10 extends around the lug 32. In addition, it enables a socket to be inserted within the enclosure 10 for the purpose of engaging the lug nut 34 and either tightening or loosening the same. Finally, as will be discussed hereafter, the internal cavity 50 and the spaced defined around the lug nut 34 and the lug 32 provide an area for receiving a composition of grease or lubricant that will provide additional protection for the lug 32 and lug nut 34.

To install the enclosure 10, the lug nut 34 is removed from the lug 32. Next, the enclosure 10 is inserted over the lug 32 by projecting the lug through the lug opening 14 of the end wall 12. The enclosure 10 and end wall 12 is pushed tightly against a wheel or rim 36 that lies exteriorly of the hub 30. Note again that the exterior side of the end wall 12 is generally convex shape. This shape is designed to be compatible with the shape of the wheel or rim 36 in the area where the lug passes through. More particularly, the wheel or rim 36 includes a concave shaped surface about the exterior thereof where the lug passes through. Consequently, when the enclosure 10 is pushed tightly against the wheel or rim 36, the convex exterior shape of the end wall 12 will tend to seat against the concave shape of the hub. Once the enclosure is fitted onto the lug 32, the lug nut is inserted through the open end of the enclosure 10 and threaded onto the lug 32. After the lug nut has been threaded onto the lug 32 and tightened by a socket, the internal cavity 50 within the enclosure is filled with a grease or lubricant. While this disclosure suggests protecting both the lug nut 34 and the lug 32, it is vitally important to protect the lug extending outwardly from the lug nut. This is because the problem of frozen lug nuts arise because the outer ends of lugs become so rusted or corroded that the lug nut cannot be screwed past the rusted or corroded outer end. Thus, it is very important to protect the exposed outer end of the lug 32. Consequently, when placing the grease or lubricant within the enclosure, it is important at the very minimum to spread an application of grease or lubricant around the exposed end of the lug 32. Finally, the end cap 20 is snapped onto the enclosure effectively closing the open end. It should be pointed out that once the snap on cap 20 is in place, that the enclosure 10 forms a relatively closed and sealed enclosure. The lug opening 14 is sized to form a relatively close fit around the lug 32. In any event, once a grease or lubricant composition has been placed on the lug 32 and the lug nut 34, and the end cap 20 has been snapped into place, this forms a generally closed and sealed protective housing or covering about the lug and lug nut.

The enclosure 10 can be constructed of various materials and can assume various shapes and sizes. It is contemplated that in one embodiment, that the end wall 12 of the enclosure would be constructed of a metal material while the surrounding side 16 and cap 20 may be constructed of a plastic material. In the second, the enclosure 10 could be constructed entirely of a molded plastic material.

Turning now to FIGS. 3–7, there is shown therein a second design for an enclosure that acts to surround and protect a lug and lug nut. The second design depicts a protective enclosure, indicated generally by the numeral 50, that is designed to simply snap on or be inserted over a lug 32 and a lug nut 34 threaded on the lug nut (see FIG. 7). The protective enclosure 50 includes a housing structure 52, a grease fitting opening 54 and a front opening 56.

The protective enclosure 50 can be constructed of various materials. However, it is contemplated that a preferred design would entail a plastic or rubber type construction that would be sufficiently flexible to enable the enclosure 50 to be pushed onto and around a lug and lug nut and at the same time result in the enclosure gripping the lug and/or lug nut with sufficient force to retain the protective enclosure 50 around the lug and lug nut.

As seen in the drawings, the forward or front portion of the enclosure 50 is formed into an open cavity 58 that is designed to receive a lug nut 34. Note that formed around the outer perimeter of the front opening 56 is a lip flange 60 that tends to extend inwardly and engage a portion of the surrounding structure of the nut 34 so as to retain the enclosure 50 about the nut 34.

The protective enclosure 50 shown in FIGS. 3–7 is designed such that a portion of the structure that forms a part of the enclosure 50 actually engages the threaded lug 32. In particular, formed interiorly within the protective enclosure 50 is a series of inwardly projecting ribs 62. The ribs 62 include a series of teeth 64 formed along an inner edge of the ribs. The teeth 64 are designed to engage with and mate with conventional threads formed around the lug 32. Consequently, the teeth 64 along with the ribs 62 result in the protective enclosure 50 being securely gripped or engaged around the lug 32.

The protective enclosure 50 is provided with a grease fitting 68 that is threaded into the grease fitting opening 54 of the enclosure 50. The grease fitting opening 54 is threaded to receive the threaded section 70 of the grease fitting.

Figure 7:
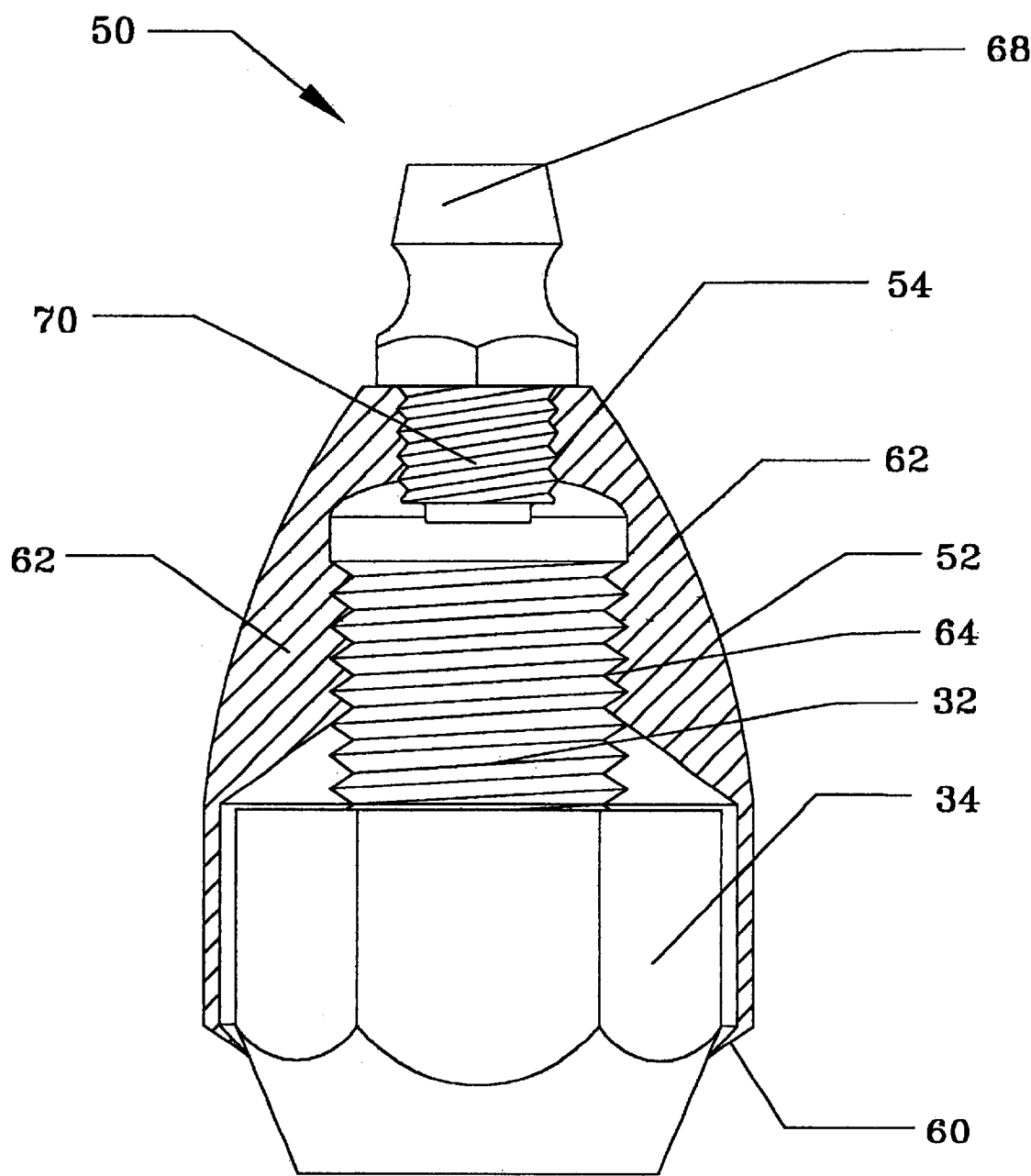
FIG. 7 is a transverse sectional view of the enclosure show in FIG. 3 showing the enclosure secured about the lug and lug nut.

In use, the entire protective enclosure 50 is simply pushed onto the combined lug 32 and lug nut 34 such that the enclosure 50 is securely retained about the lug 32 and lug nut 34. The plastic or rubber or resilient material used to construct the protective enclosure 50 is designed such that the basic housing 52 and associated structure of the enclosure will yield and even slightly expand as the enclosure is pushed onto and around the nut 34. However, once the enclosure 50 is in place, such as illustrated in FIG. 7, the material comprising the enclosure 50 will tend to collapse and grip the lug 32 and even the lug nut 34 so as to securely hold the protective enclosure 50 around the lug 32 and associated lug nut 34.

To protect the lug and even the lug nut, grease or a lubricant is injected into the enclosure via the grease fitting 68. This grease or other type of lubricant will surround the lug 32 and can surround the lug nut 34 so as to protect the same and to prevent the lug and lug nut from becoming corroded or rusted.

Thus, to remove the lug nut 34, the enclosure 50 is simply popped off or pulled off the lug and lug nut and because of the protective coating of grease or other lubricant there is no rust or corrosion and consequently, the nut is easily removed from the lug.

From the foregoing specification and discussion, it is appreciated that the enclosure 10 of the present invention provides a protective barrier that encases a segment of the lug 32 extending from a hub. This protective barrier or enclosure enables a grease or lubricant to be injected or placed in the interior thereof and in and around the lug and lug nut such that when the enclosure 10 or 50 is closed, the lug and lug nut are protected from the elements of weather and other adverse conditions including protection against water if the lug, lug nut and enclosure are in fact submerged in water.

The present invention may, of course, be carried out in other specific ways than those herein set forth without parting from the spirit and essential characteristics of the invention. The present embodiments are, therefore, to be considered in all respects as illustrative and not restrictive, and all changes coming within the meaning and equivalency range of the appended Claims are intended to be embraced therein.

What is claimed is:

1. An enclosure for enclosing a lug and lug nut extending from a hub comprising: an enclosure having an end wall, a surrounding side, and an open end opposite the end wall; a lug opening formed in the end wall that enables the lug to be extended through the end wall into the confines of the enclosure; the enclosure having a depth and circumference sufficient to allow the lug nut to be threaded onto the lug confined within the enclosure and driven to a position internally within the enclosure; and a cap secured to the enclosure for closing the open end, and wherein a lubricant can be placed within the enclosure around the enclosed lug and lug nut prior to the cap being secured to the enclosure such that the lug and lug nut are protected from rust and corrosion.

2. The enclosure of claim 1 wherein the cap snaps onto the enclosure.

3. The enclosure of claim 2 wherein the enclosure includes a lip and the cap includes a snap ring that is operative to snap over the lip and secure the cap onto the open end of the enclosure.

4. The enclosure of claim 1 wherein in an installed mode the surrounding side of the enclosure is spaced outwardly from the lug nut so as to allow a socket to be inserted into the enclosure and around the lug nut in order that the lug nut may be tightened or removed from the lug.

5. The enclosure of claim 4 wherein the surrounding side of the enclosure assumes a generally cylindrical shape.

6. The enclosure of claim 1 wherein the end wall of the enclosure is formed of a metal material while the surrounding side is formed of a plastic material but wherein the end wall and surrounding side are of an integral construction.

7. The enclosure of claim 1 wherein the interior side of the end wall assumes a generally concave shape.

8. A protective enclosure for enclosing a lug and protecting the same from rust and corrosion comprising an enclosure that extends around and encloses at least a portion of the lug wherein the enclosure includes a grease fitting that permits grease or lubricant to be inserted within a cavity formed within the enclosure, and wherein the enclosure is directly supported by the lug and projects over and around a lug nut that is threaded onto the lug.

9. The enclosure of claim 8 wherein the enclosure includes an end having a lug opening formed therein that enables the enclosure to be fitted over the lug.

10. The enclosure of claim 8 wherein when installed around a lug and a lug nut the enclosure includes a lubricant housed therein that extends around the lug and lug nut enclosed within the enclosure.

11. A method of protecting a lug and lug nut from rust and corrosion comprising: placing an enclosure around the lug and lug nut and placing a lubricant into the enclosure and around the lug and lug nut; and wherein the enclosure includes a grease fitting that permits grease or lubricant to be inserted into an inner cavity formed within the enclosure.

12. The method of claim 11 wherein the enclosure includes an open end that permits the same to be inserted over the lug and lug nut.

13. The method of claim 11 wherein the enclosure includes at least one inner gripper for engaging and gripping the lug for the purpose of securing the enclosure about the lug.

14. The protective enclosure for enclosing a lug and protecting the same from rust and corrosion of claim 8 including inwardly projecting ribs that project inwardly from the enclosure and include teeth for engaging threads associated with the lug being protected by the enclosure.

15. A protective enclosure for enclosing a lug and protecting the same from rust and corrosion comprising an enclosure that extends around and encloses at least a portion of the lug wherein the enclosure includes a grease fitting that permits grease or lubricant to be inserted within a cavity formed within the enclosure; and wherein the enclosure includes an end having a lug opening formed therein that enables the enclosure to be fitted over the lug.

16. A protective enclosure for enclosing a lug and protecting the same from rust and corrosion comprising an enclosure that extends around and encloses at least a portion of the lug wherein the enclosure includes a grease fitting that permits grease or lubricant to be inserted within a cavity formed within the enclosure wherein when installed around a lug and a lug nut the enclosure includes a lubricant housed therein that extends around the lug and lug nut enclosed within the enclosure.

17. A protective enclosure for enclosing a lug and protecting the same from rust and corrosion comprising an enclosure that extends around and encloses at least a portion of the lug wherein the enclosure includes a grease fitting that permits grease or lubricant to be inserted within a cavity formed within the enclosure, and inwardly projecting ribs that project inwardly from the enclosure and include teeth for engaging threads associated with the lug being protected by the enclosure.

* * * * *